United States Patent
Hwang

(10) Patent No.: US 6,633,553 B1
(45) Date of Patent: Oct. 14, 2003

(54) APPARATUS AND METHOD FOR FORWARD POWER CONTROLLING IN CDMA MOBILE TELECOMMUNICATION SYSTEM

(75) Inventor: Jong-Yoon Hwang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/476,435

(22) Filed: Dec. 30, 1999

(30) Foreign Application Priority Data

Dec. 31, 1998 (KR) .................................. 10-1998-0062738

(51) Int. Cl.⁷ ............................................... H04Q 7/212
(52) U.S. Cl. ......................................... 370/329; 370/335
(58) Field of Search ........................... 370/335, 342, 370/252, 465, 468; 375/130, 140, 341, 346, 347, 348, 326, 329; 455/67.1, 67.3, 65, 69, 522

(56) References Cited

U.S. PATENT DOCUMENTS

| | | | | |
|---|---|---|---|---|
| 5,319,672 A | * | 6/1994 | Sumiya et al. ................. 375/1 |
| 5,333,175 A | * | 7/1994 | Ariyavisitakul et al. ...... 379/58 |
| 5,764,687 A | * | 6/1998 | Easton ........................ 375/206 |
| 5,771,461 A | * | 6/1998 | Love et al. ................. 455/522 |
| 5,974,082 A | * | 10/1999 | Ishikawa et al. ............ 375/206 |
| 6,381,445 B1 | * | 4/2002 | Ue et al. ...................... 455/69 |
| 6,400,929 B1 | * | 6/2002 | Ue et al. ...................... 455/69 |
| 6,405,052 B1 | * | 6/2002 | Faber .......................... 455/522 |
| 2002/0068534 A1 | * | 6/2002 | Ue et al. ...................... 455/92 |
| 2002/0186677 A1 | * | 12/2002 | Leung ........................ 370/342 |

* cited by examiner

Primary Examiner—Lester G. Kincaid
Assistant Examiner—Naghmeh Mehrpour
(74) Attorney, Agent, or Firm—Dilworth & Barrese, LLP

(57) ABSTRACT

A forward power controlling apparatus in a CDMA mobile communication system is provided. In the forward power controlling apparatus, an SIR measurer measures the SIR of each received frame on a forward user channel using all the demodulated symbols of the frame, a symbol rate detector detects symbol rate information inserted in a predetermined position of the frame, and a controller changes a threshold according to the detected symbol rate information, compares the threshold with the SIR, and generates a forward power control command.

18 Claims, 6 Drawing Sheets

APPARATUS AND METHOD FOR FORWARD POWER CONTROLLING IN CDMA MOBILE TELECOMMUNICATION SYSTEM

BACKGROUND OF THE INVENTION

1. Field of the Invention

The present invention relates generally to a CDMA (Code Division Multiple Access) communication system, and in particular, to an apparatus and method for forward power controlling in a receiving device.

2. Description of the Related Art

Power control in a CDMA mobile communication system is described in two ways: forward power control and reverse power control. The forward power control is performed on the transmission power of a base station so that a mobile station can receive a forward traffic channel with a predetermined SIR (Signal to Interference Ratio) from the base station. By the forward power control, the base station increases its transmission power for a mobile station in a bad channel environment and decreases it for a mobile station in a favorable channel environment so that the mobile stations can demodulate data stably. In terms of a system, the forward power control prevents power consumption of a traffic channel transmitted to mobile stations, thereby increasing the capacity of each cell.

Meanwhile, a mobile station is highly susceptible to interference from base stations other than a serving base station when the mobile station is at the boundary of a cell or behind a building. This is termed a corner problem of a forward channel. In this case, the mobile station needs higher reception power than a mobile station near to the serving base station. Therefore, the mobile station notifies the base station of channel status according to the error rate of received frames and the serving base station controls its transmission power based on the received channel status information to allow the mobile station to maintain a predetermined reception power level. This forward power control can be closed-loop power control.

The channel status is checked by measuring the SIR of a signal received at the mobile station. The mobile station can also compare the SIR measurement with a threshold variable depending on the error rate of frames in a demodulator and notify the base station of the comparison result. The threshold may vary in proportion to the frame error rate. The forward power control using the variable threshold corresponding to the frame error rate is called an outer-loop power control.

Meanwhile, according to the radio standard of CDMA-2000, channel status is determined by measuring the ratio of the reception power of a forward channel to interference from other cells, that is, the SIR of a received signal, for forward power control. In this method, a rake receiver in each mobile station measures interference from each path and the strength of a user channel input signal from each path, and compares an SIR with a predetermined threshold.

The interference can be measured using a pilot channel or a sync channel. As an alternative, an approximate interference strength can be measured utilizing orthogonal noise components.

As suggested currently, the reception strength of a forward user channel is measured by measuring the size of the symbols of a power control command directed to a mobile station by a base station for reverse closed-loop power control. In prior art, a mobile station detects the position and size of a power control command symbol in each power control group of a received forward traffic channel signal and squares the symbol size value. However, only a part of a power control group is used for measuring the user channel strength in the conventional technology. Consequently, the forward channel measurement is inaccurate due to lack of symbols for use in the forward user channel measurement. For example, if only three or four power control command symbols among 36 symbols of a 1.25 msec power control group are used in measuring the reception strength of a forward user channel, the measurement is inaccurate in a bad channel environment such as a fading channel. As a result, the mobile station transmits a wrong forward power control command to the base station and then the base station cannot perform a desired forward power control. That is, the base station may increase its high transmission power or decreases its low transmission power based on the wrong forward power control command, resulting in inefficient power use. Traditionally, use of unnecessary high transmission power decreases the entire available cell capacity.

FIG. 1 is a block diagram of a device for measuring the SIR of a forward user channel using reverse power control symbols in a conventional CDMA mobile communication system.

A finger 100 subjects an input signal to PN despreading and orthogonal despreading and outputs the despread, demodulated symbols to a combiner. To demodulate symbols of signals received from different paths, a plurality of fingers 100 are provided. The combiner combines the outputs of the fingers corresponding to the multiple paths and outputs the combined value to a channel decoder.

A despreader 110 in the finger 100 despreads input I- and Q-channels by multiplying them by a PN sequence received from a PN generator 160. A multiplier 115 extracts orthogonally demodulated traffic channel data by multiplying the output of the despreader 110 by a traffic channel orthogonal code Wt received from an orthogonal code generator (not shown). A symbol accumulator 120 accumulates the output of the multiplier 115 in symbol units.

A multiplier 140 extracts pilot channel data by multiplying the output of the despreader 110 by a pilot channel orthogonal code Wo received from the orthogonal code generator. A symbol accumulator 145 accumulates the output of the multiplier 140 in symbol units.

A multiplier 125 multiplies the output of the symbol accumulator 120 by a complex conjugate of the output of the symbol accumulator 145. That is, the multiplier 125 multiplies the traffic channel data by the complex conjugate of the strength and phase component of a pilot channel, thereby compensating for the phase component of the traffic channel data. The multiplier 125 outputs the demodulated symbols to the combiner (not shown).

Meanwhile, a power control symbol squarer 130 measures the power levels of reverse power control command symbols inserted in predetermined positions of the orthogonally demodulated channel data received from the symbol accumulator 120. A symbol accumulator 135 accumulates the output of the power control symbol squarer 130 in symbol units and outputs the strength of the received forward user channel. Here, since two symbols are inserted in each power control group, a frame having a total of 32 reverse power control command symbols can be defined as a corresponding accumulation period.

An interference signal measurer 150 measures the interference strength of the output of the despreader 110. A divider 155 calculates an SIR by dividing the received forward user channel strength by the interference strength and outputs the SIR to a forward power controller (not shown). The forward power controller sums the SIRs received from the plurality of fingers and determines a forward power control command to be transmitted to the base station according to the frame error rate of the channel decoder (not shown).

In the conventional method, a forward user channel reception strength is obtained by squaring reverse power control command symbols transmitted in each power control group of the forward traffic channel signal.

To solve problems of the conventional method that utilizes only a part of a power control group for measuring the strength of a received forward user channel, the present invention suggests a method for measuring the strength of a received forward user channel that utilizes all of the symbols of the forward user channel. The symbol rate of a frame in received user data changes every 20 ms according to the voice activity of a user. That is, a transmission power level per symbol of each data frame varies depending on symbol repetition at a transmitter. For example, a transmission power per symbol at a frame transmission rate of 4800 bps is a half that at 9600 bps. A transmission power per symbol at 2400 bps is a fourth that at 9600 bps. Hence, SIRs being a basis of channel measurement cannot be compared with a threshold produced without considering the symbol rate of each received frame.

Although the symbol rate of a received frame can be detected by channel decoding following symbol demodulation, a fading channel environment of a received signal has already changed at the time point of the symbol rate detection. Therefore, the channel measurement is impossible. Only if information about the symbol rate of a frame is written in a data frame format and a power measuring device at a receiver can accurately analyze the information, a forward user channel can be accurately measured using all symbols of a received frame. Here, the power measuring device considers a transmission power per symbol variable with the symbol rate of a received frame by comparing the SIR of each received frame with a threshold that varies depending on the symbol rate information.

SUMMARY OF THE INVENTION

It is, therefore, an object of the present invention to provide a data frame structure having symbol rate information to accurately measure the strength of a received forward user channel signal in a CDMA mobile communication system.

It is another object of the present invention to provide an apparatus and method for forward power controlling by measuring the SIR of a forward user channel using all symbols of received frames in a CDMA mobile communication system.

It is a further object of the present invention to provide an apparatus and method for accurate forward power controlling by measuring the SIR of a forward user channel using all symbols of a received frame and comparing the measured SIR with a threshold corresponding to the symbol rate of the received frame in a CDMA mobile communication system.

These and other objects are achieve d by providing a forward power controlling apparatus in a CDMA mobile communication system as described herein. In the forward power controlling apparatus, an SIR measurer measures the SIR of each received frame on a forward user channel using all the demodulated symbols of the frame, a symbol rate detector detects symbol rate information inserted in a predetermined position of the frame, and a controller changes a threshold according to the detected symbol rate information, compares the threshold with the SIR, and generates a forward power control command.

According to another aspect of the present invention, there is provided a forward power controlling method in a CDMA mobile communication system. In the forward power controlling method, the SIR of each received frame on a forward user channel is measured using all the demodulated symbols of the frame, symbol rate information is detected from a predetermined position of the frame, a threshold is varied according to the detected symbol rate information and compared with the SIR, and a forward power control command is generated.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

In accordance with the present invention, all symbols of a received frame are used to accurately measure the strength of a forward user channel, taking account of a variable symbol rate of the forward, user channel frame. Information about a frame symbol rate is added in a user channel frame format. A forward power controlling apparatus recognizes the information, compares a measured SIR with a threshold varied with the frame symbol rate information, and then generates a corresponding forward power control command.

Figure 1:
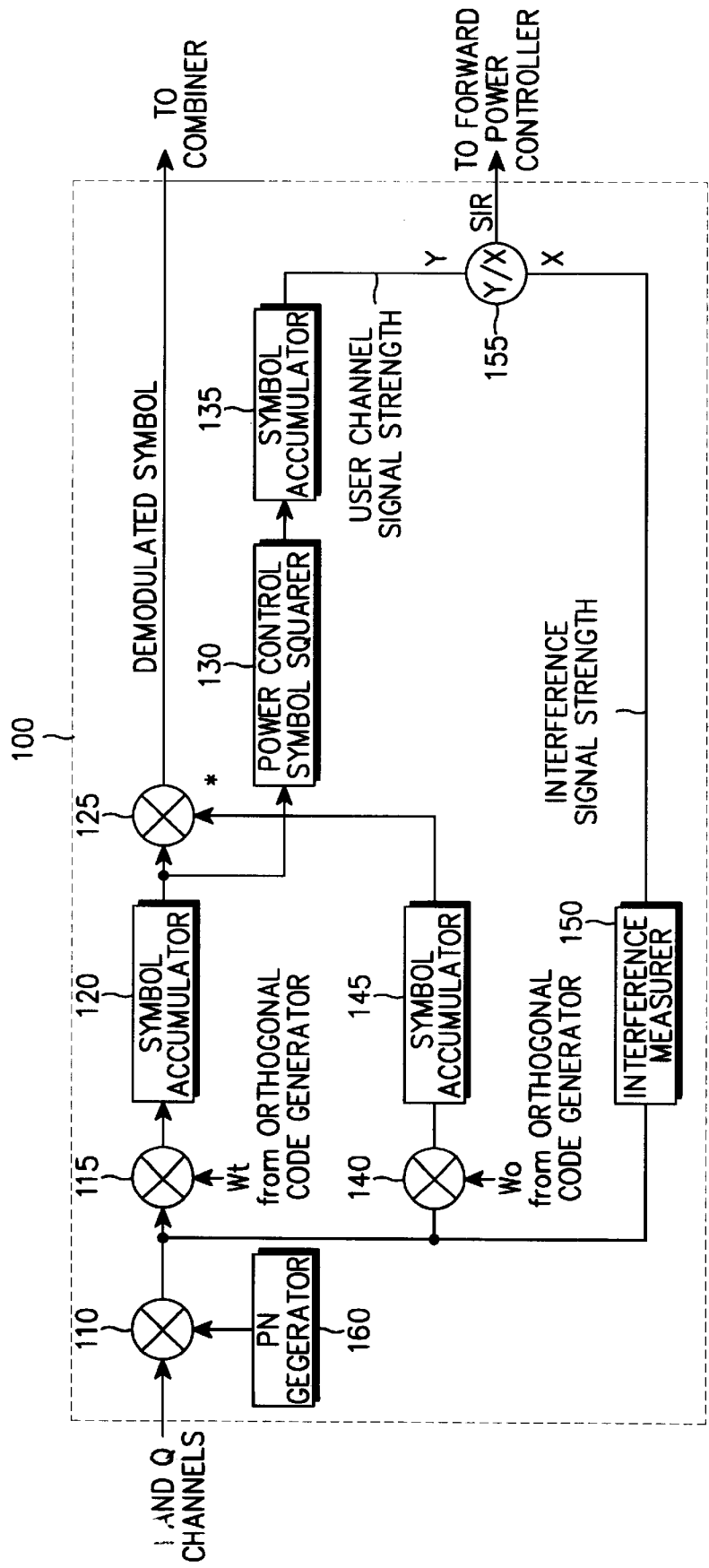
FIG. 1 is a block diagram of a device for measuring the SIR of a forward user channel in a conventional CDMA mobile communication system.
Figure 2:
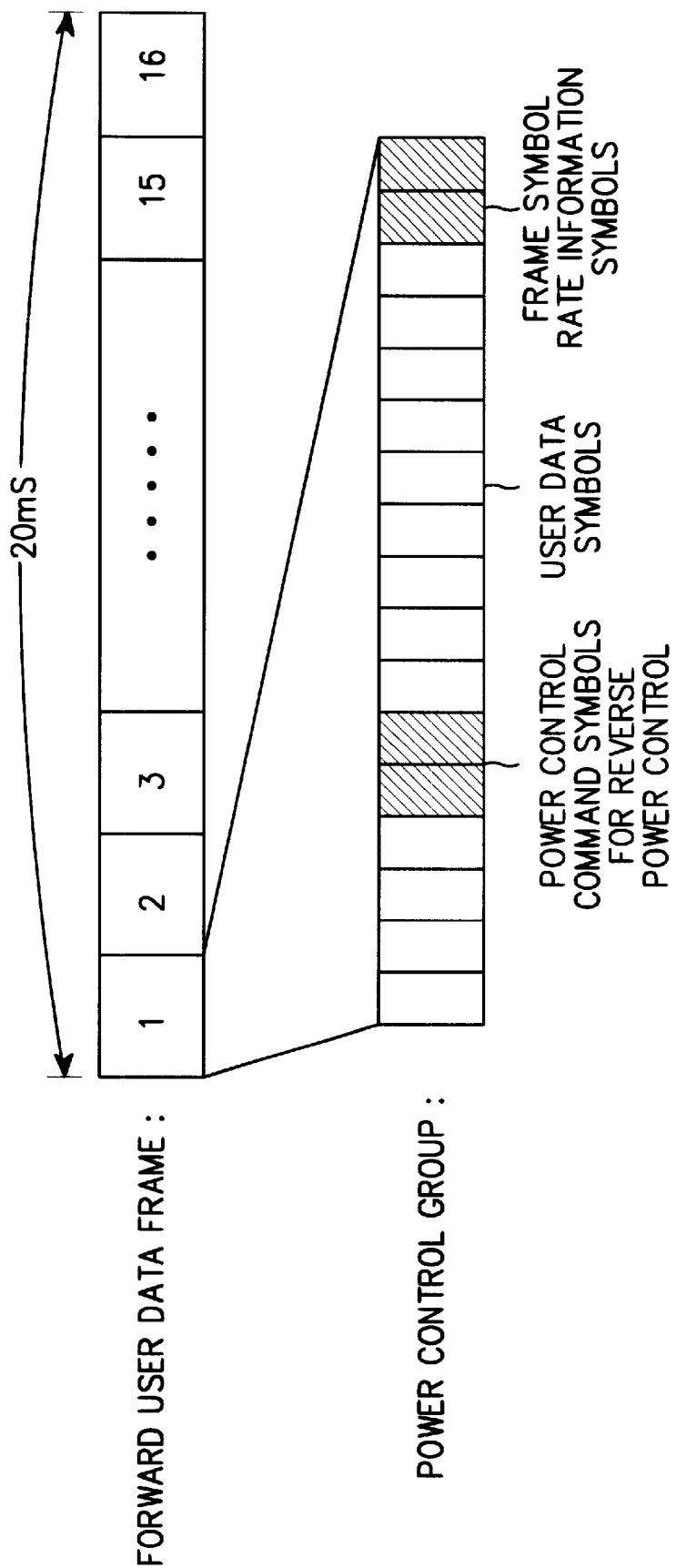
FIG. 2 illustrates the structure of a forward user data frame according to an embodiment of the present invention.

FIG. 2 illustrates the structure of a forward user data frame according to an embodiment of the present invention.

In FIG. 2, a forward user data frame is 20 ms in duration and includes 16 power control groups. Each power control group has 18 symbols. Frame symbol rate information can be provided in any one of the power control groups in the forward user data frame of the present invention. According to one embodiment of the present invention FIG. 2 shows that the frame symbol rate information present in the first power control group. That is, the power control group is comprised of power control command symbols for reverse power control, user data symbols, and frame symbol rate information symbols added according to the present invention.

To prevent the frame symbol rate information symbols from coinciding with the power control command symbols, the frame symbol rate information symbols can be located in 6 symbol locations of the latter half of 18 symbols of a predetermined power control group in a received frame. A plurality of (e.g., two or four) frame symbol rate information symbols may exist.

A transmitter punctures channel encoded symbols at predetermined positions and inserts the frame symbol rate information symbols at the positions. The transmission power of the frame symbol rate information symbols may be higher than any other symbol. For example, the transmission power level 0, 3, or 6 dB. Therefore, the frame symbol rate information can be stably demodulated after passing through a fading channel.

Meanwhile, while a power control command symbol is transmitted in every power control group, the frame symbol rate information symbols need not to be transmitted in each power control group. As compared to the influence of the power control command symbol, the influence of the frame symbol rate information symbols on a receiver is negligible during decoding. Before decoding, the power control command symbol and the frame symbol rate information symbols are extracted and predetermined symbols are inserted into the extracted positions. The inserted symbols are different from data symbols, resulting in decoding errors. Furthermore, received symbols are deinterleaved before decoding. Hence, the influence of the power control command symbol and the frame symbol rate information symbols gets smaller because both the power control command symbol and the frame symbol rate information symbols are consecutively received but distributed across the entire frame after deinterleaving. It is a well-known fact that possible errors in scattered symbols have a less influence than symbol in successive symbol.

The power controller to be described later detects the symbol rate information in a preset position of a received symbol-demodulated frame and changes a threshold to be compared with the SIR of the received frame according to the detected information.

Figure 3:
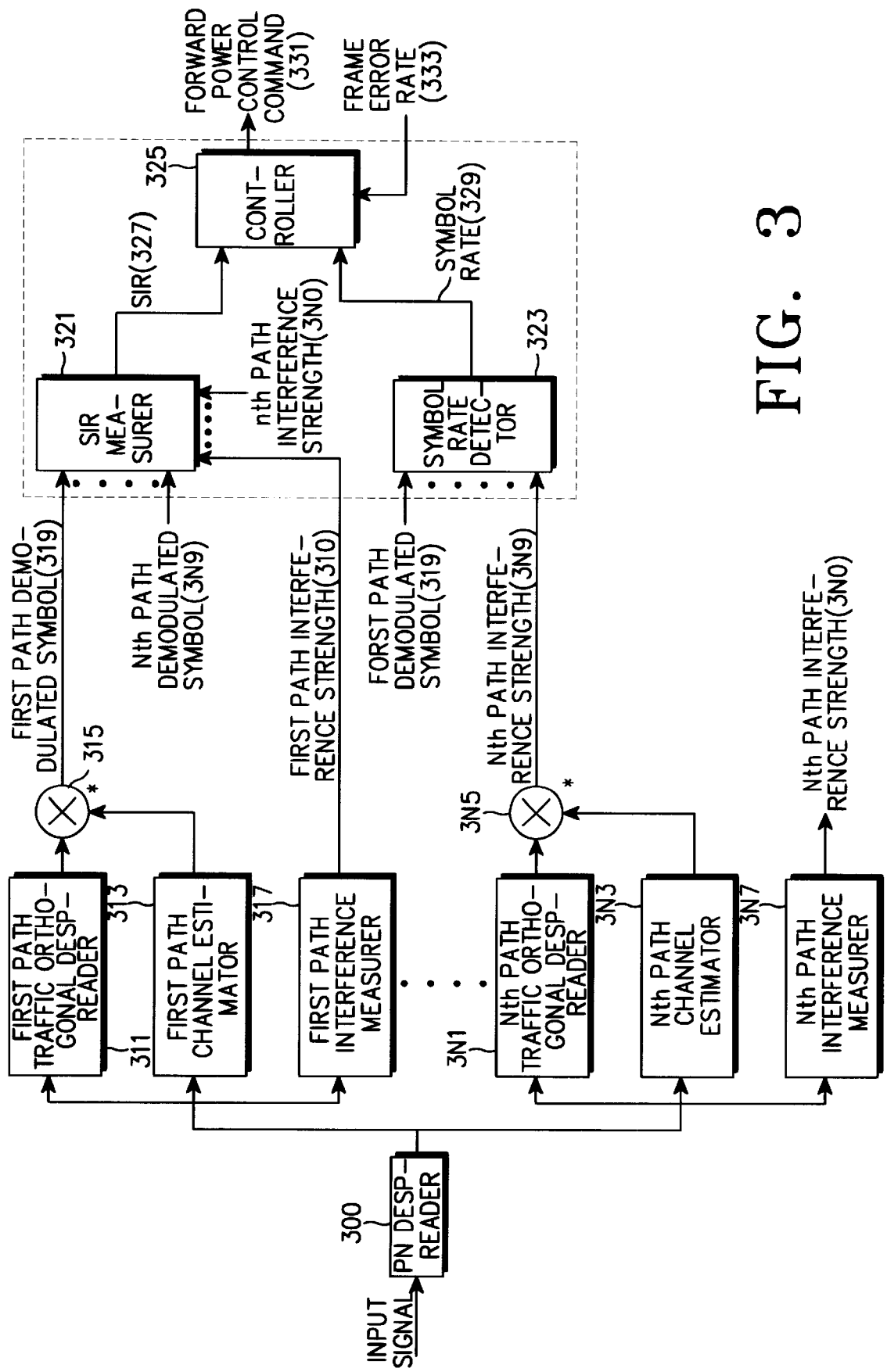
FIG. 3 is a block diagram of a forward power controlling apparatus in a CDMA mobile communication system according to an embodiment of the present invention.

FIG. 3 is a block diagram of a forward power controlling apparatus in a CDMA mobile communication system according to an embodiment of the present invention.

Referring to FIG. 3, a PN despreader 300 at a receiver PN-despreads a received signal by multiplying the received signal by a mobile generated PN sequence. First to Nth path traffic orthogonal despreaders 311 to 311(N) multiply the PN-despread received signal by traffic channel orthogonal codes, for orthogonal despreading.

First to Nth path channel estimators 313 to 313(N) detect the strengths and phases of pilot signals for the PN-despread received signal. Multipliers 315 to 315(N) multiply the complex conjugates of the pilot signal strength measurements and phases detected for the respective paths by the orthogonally despread user channel signals, for phase compensation. The multipliers 315 to 315(N) also output symbols demodulated for the paths (first to Nth path demodulated symbols 319 to 319(N)).

First to Nth path interference measurers 317 to 317(N) measure noise of the PN-despread signals in the paths and output first to Nth path interference strength measurements 310 to 310(N). The interference measurers 317 to 317(N) can use a pilot channel or a sync channel. In addition, the interference measurers 317 to 317(N) can approximate the strengths of interference including orthogonal noise components.

An SIR measurer 321 receives the first to Nth path demodulated symbols 319 to 319(N) and measures the reception strengths of each path demodulated symbol in frame units. That is, the SIR measurer 321 squares each symbol in a corresponding frame and calculates the reception power of each path. The SIR measurer 321 calculates an SIR for each path by dividing the reception strengths for each path by the first to Nth path interference strength measurements 310 to 3N0. The SIR measurer 321 sums the SIRs, averages the sum, and outputs the resulting SIR 327.

A symbol rate detector 323 of a forward power controlling apparatus s 320 receives at least one of the first to Nth path demodulated symbols 319 to 319(N) and detects the symbol rate of a corresponding received frame from the input demodulated symbol. A user data frame according to the present invention includes information about the symbol rate in a preset position. The user data frame format can be constructed as shown in FIG. 2.

A controller 325 receives the SIR 327 and a symbol rate 329 and has a variable threshold for each symbol rate. For example, if a threshold is 1 for a symbol rate of 9600 bps, thresholds for 4800 and 2400 bps can be ½ and ¼, respectively. The controller 325 changes a threshold according to the symbol rate 329, compares the SIR 327 with the variable threshold, and generates a forward power control command 331. For example, if the SIR 327 is greater than the threshold varied with the symbol rate, the controller 325 can generate the forward power control command 331 ordering power-down. If the SIR 327 is less that the threshold, the forward power control command 331 orders power-up. The controller 325 can receive frame error rate information 333 from a channel decoder (not shown), to thereby perform an outer-loop power control.

Figure 4:
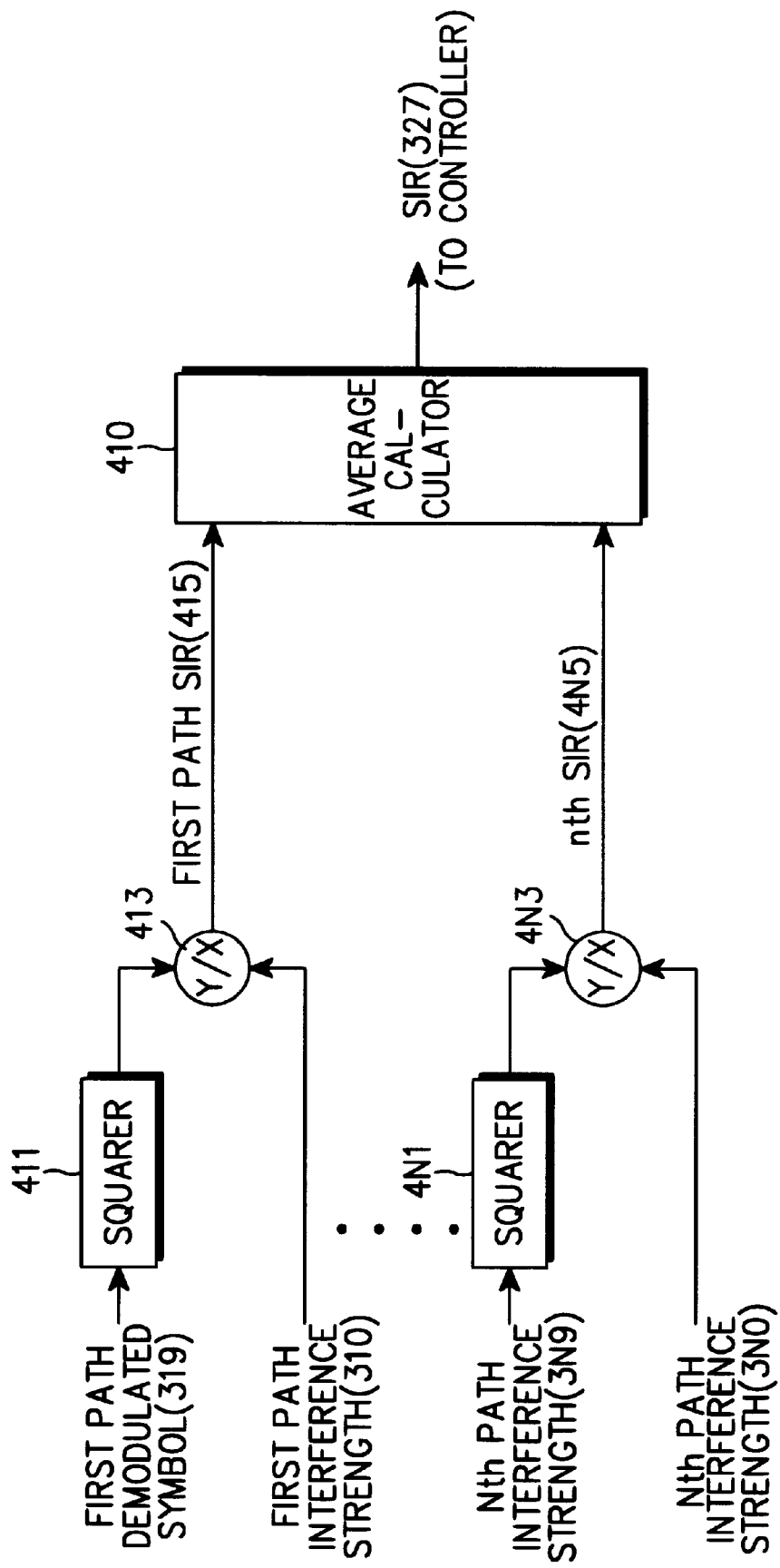
FIG. 4 is a detailed block diagram of an SIR measurer shown in FIG. 3.

FIG. 4 is a block diagram of the SIR measurer 321 according to an embodiment of the present invention. The SIR measurer 321 will be described referring to FIG. 3.

Referring to FIG. 4, squarers 411 to 411(N) receive the first to Nth path demodulated symbols 319 to 319(N) and calculate reception strengths by squaring all symbols of each received frame. Dividers 413 to 413(N) the reception strengths calculated in frame units by the first to Nth path interference strength, measurements 310 to 310(N) and output first to Nth path SIRs 415 to 415(N). An average calculator 410 sums the first to Nth path SIRS 415 to 4N5, takes an average of the sum, and outputs the SIR 327. The squarers 411 to 4N1 and the dividers 413 to 4N3 can be provided to a finger in each path.

Figure 5:
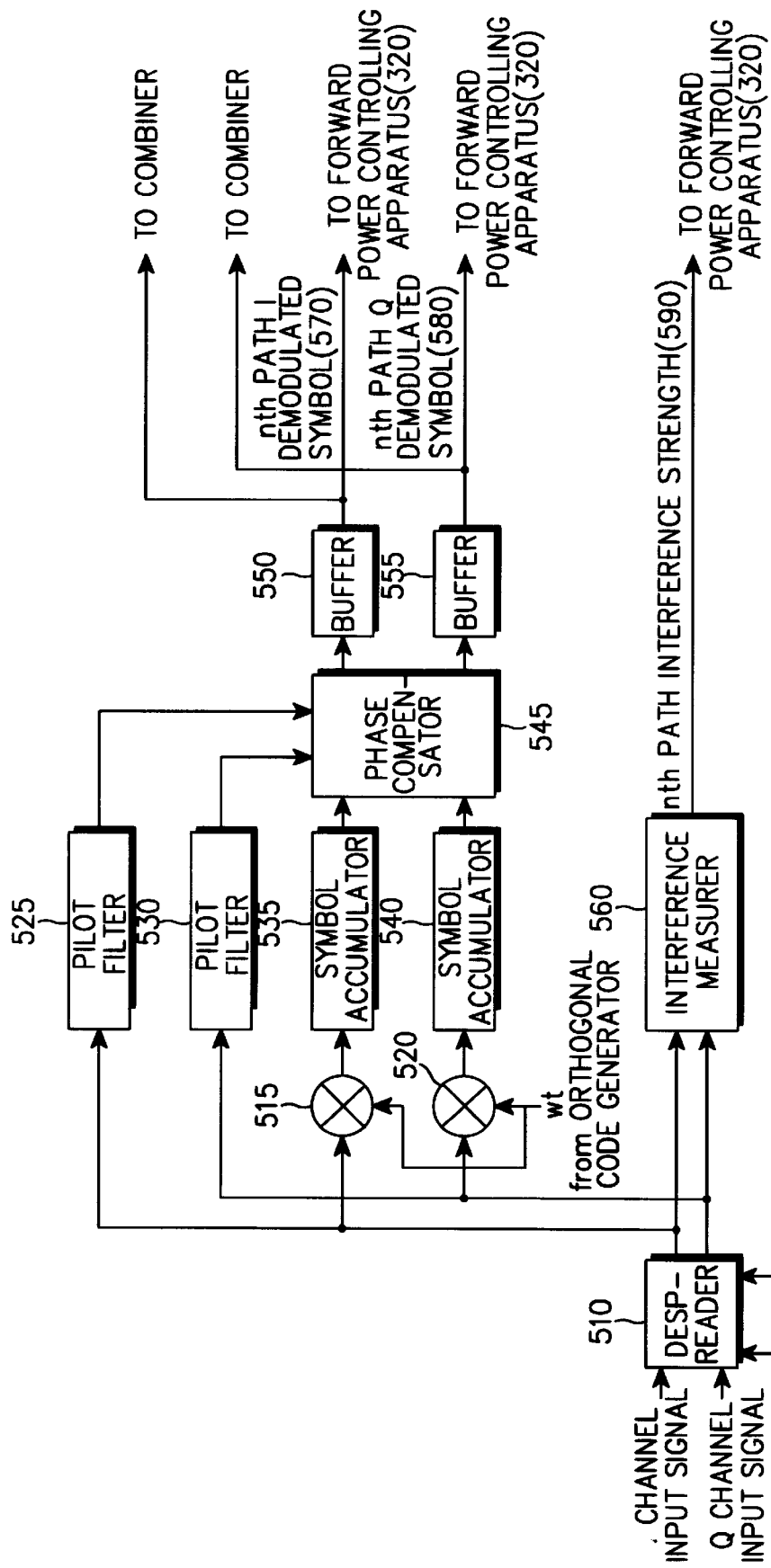
FIG. 5 is a block diagram of a finger according to an embodiment of the present invention.

FIG. 5 is a block diagram of a finger according to the embodiment of the present invention. According to an embodiment of the present invention, a user channel reception strength measuring device and an SIR calculating device are not shown in the finger of FIG. 5. The finger outputs demodulated symbols and interference strength measurements to the forward power controlling apparatus 320 and the combiner (not shown) of FIG. 3.

A despreader 510 in an nth ($1 \leq n \leq N$) path finger multiplies received I- and Q-channel signals by sequences PN_I and PN_Q generated from a PN generator (not shown), for despreading. A multiplier 515 extracts orthogonally demodulated traffic channel data by multiplying the despread I channel by an orthogonal code Wt generated from an orthogonal code generator (not shown) for a traffic channel being a user data channel. A multiplier 520 extracts orthogonally demodulated traffic channel data by multiplying the despread Q channel by the traffic channel orthogonal code Wt generated from the orthogonal code generator.

Symbol accumulators 535 and 540 accumulate the orthogonally demodulated I- and Q-channel data in symbol units, respectively. Pilot filters 525 and 530 extract I- and Q-pilot channel data from the Output of the despreader 510, respectively. A phase compensator 545 receives the outputs of the symbol accumulators 535 and 540 and the pilot filters 525 and 530 and compensates for the phase components of the I- and Q-channel demodulated symbols. Buffers 550 and 555 output nth path I- and Q-channel demodulated symbols 570 and 580. The nth path I- and Q-channel demodulated symbols 570 and 580 correspond to a specific one among the first to Nth demodulated symbols 319 to 3N9 of FIG. 3. The nth path I- and Q-channel demodulated symbols 570 and 580 are output to the forward power controlling apparatus 320 according to the present invention and the combiner. An interference measurer 560 measures the noise of the PN-despread received signal and outputs an nth path, interference strength measurement 590. The nth path interference strength measurement 590 corresponds to a specific one among the first to Nth path interference strength measurements 310 to 3N0 of FIG. 3. The nth path interference strength measurement 590 is output to the forward power controlling apparatus 320 according to the present invention.

Figure 6:
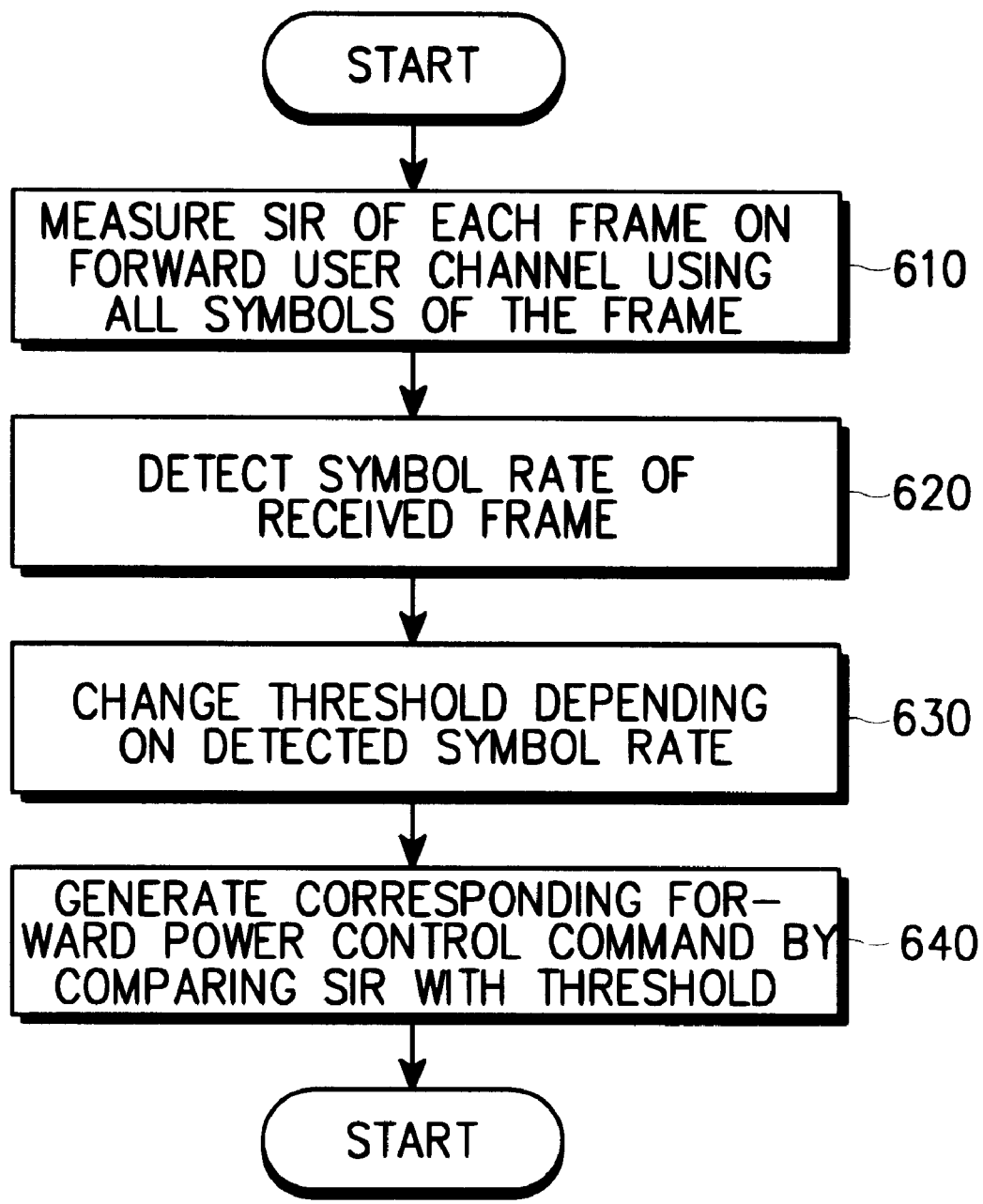
FIG. 6 is a flowchart illustrating a forward power controlling operation in the CDMA mobile communication system according to an embodiment of the present invention.

FIG. 6 is a flowchart illustrating a forward power controlling method in a CDMA mobile communication system according to the embodiment of the present invention.

Referring to FIG. 6 in step 610, the SIR measurer, 321 shown in FIG. 3 receives the demodulated symbols 319 to 319(N) and interference strength measurements 310 to 3N0 for the paths and measures the SIR of each frame using all the symbols of the frame of a forward user channel. Step 610 may include the steps of calculating the reception strength of the forward user channel in each path by squaring all the demodulated symbols 319 to 319(N) of a received frame in each path, obtaining an SIR in each path by dividing the reception strengths by the interference strengths in the respective paths, and calculating the SIR by adding the SIRs for all the paths and averaging the sum. The step of calculating the reception strength of the forward user channel in each path is performed in the squarers 411 to 4N1 shown in FIG. 4, the step of calculating an SIR for each path is performed in the dividers 413 to 4N3 shown in FIG. 4, and the SIR calculating step is performed in the average calculator 410.

In step 620 the symbol rate detector 323 shown in FIG. 3 receives the demodulated symbols for the paths, detects information about the symbol rate of each forward user channel frame in a predetermined position, and determines the symbol rate. Here, the frame symbol rate information is provided by frame symbol rate information symbols in one of specific power control groups of the frame. The frame symbol rate information symbols may be in positions different from those of power control symbols. In addition, the frame symbol rate information symbols can be produced by puncturing at a transmitter.

The controller 325 of FIG. 3 changes a threshold according to the detected frame rate. If a threshold for 9600 bps is 1, thresholds for 4800 and 2400 bps are ½ and ¼, respectively.

In step 640 the controller 325 compares the SIR calculated in frame units with the variable threshold and generates a corresponding forward power control command. If the SIR is greater than the threshold, the controller 325 generates the forward power control command 331 ordering power-down and if the SIR is less than the threshold, the controller 325 generates the forward power control command 331 ordering power-up. The controller 325 can receive the frame error rate information 333 from the channel decoder, to thereby perform an outer-loop power control.

As described above, the present invention accurately measures the reception strength of a forward user channel using all the symbols of a received frame, considering the variable symbol rate of the user channel frame in a CDMA mobile communication system. According to the present invention, a user channel frame format is configured to include frame symbol rate information. The forward power controlling apparatus detects the information, compares a measured SIR with a threshold varied with the frame symbol rate information, and generates a corresponding forward power control command.

According to the present invention as described above, the reception strength of a forward user channel is accurately measured using all symbols of a received frame in a CDMA mobile communication system. Therefore, a base station can prevent unnecessary power consumption for maintaining an SNR in a mobile station. As a result, unnecessary forward transmission power dissipation and the decrease of cell capacity can be prevented.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A forward power controlling apparatus in a CDMA mobile communication system, comprising:
    an SIR measurer for measuring the SIR of each received frame on a forward user channel using all the demodulated symbols of the frame;
    a symbol rate detector for detecting symbol rate information inserted in a predetermined position of the frame; and
    a controller for changing a threshold according to the detected symbol rate information, comparing the threshold with the SIR, and generating a forward power control command.

2. The forward power controlling apparatus of claim 1, wherein the symbol rate information is inserted not to be overlapped with reverse power control symbols in one of power control groups of the frame.

3. The forward power controlling apparatus of claim 1, wherein the controller generates a forward power control command ordering power-down if the SIR is greater than the threshold and a forward power control command ordering power-up if the SIR is less than the threshold.

4. The forward power controlling apparatus of claim 1, wherein the threshold is varied in proportion to the symbol rate represented by the detected symbol rate information.

5. A forward power controlling apparatus in a CDMA mobile communication system, comprising:
    an SIR measurer for receiving demodulated symbols from different paths and strengths of interferences from the paths, and measuring the SIR of each frame using all the demodulated symbols of the frame;
    a symbol rate detector for receiving demodulated symbols of one path among the different-path demodulated symbols and detecting symbol rate information from demodulated symbols in predetermined positions; and a controller for changing a threshold according to the detected symbol rate information, comparing the threshold with the SIR, and generating a forward power control command.

6. The forward power controlling apparatus of claim 5, wherein the SIR measurer comprises:

a plurality of squarers for measuring reception strengths of the demodulated symbols from the different paths;

a plurality of dividers for measuring the SIR of a frame of each path using the reception strength and interference strength of the frame; and an average calculator for measuring a final SIR by averaging the SIRs received from the dividers.

7. The forward power controlling apparatus of claim 5, wherein the symbol rate information is inserted not to be overlapped with reverse power control symbols in one of power control groups of the frame.

8. The forward power controlling apparatus of claim 5, wherein the controller generates a forward power control command ordering power-down if the SIR is greater than the threshold and a forward power control command ordering power-up if the SIR is less than the threshold.

9. The forward power controlling apparatus of claim 5, wherein the threshold is varied in proportion to the symbol rate represented by the detected symbol rate information.

10. A forward power controlling method in a CDMA mobile communication system, comprising the steps of:

measuring the SIR of each received frame on a forward user channel using all the demodulated symbols of the frame;

detecting symbol rate information inserted in a predetermined position of the frame; and changing a threshold according to the detected symbol rate information, comparing the threshold with the SIR, and generating a forward power control command.

11. The forward power controlling method of claim 10, wherein the symbol rate information is inserted not to be overlapped with reverse power control symbols in one of power control groups of the frame.

12. The forward power controlling method of claim 10, wherein a forward power control command ordering power-down is generated if the SIR is greater than the threshold and a forward power control command ordering power-up is generated if the SIR is less than the threshold in the forward power control command generating step.

13. The forward power controlling method of claim 10, wherein the threshold is varied in proportion to the symbol rate represented by the detected symbol rate information.

14. A forward power controlling method in a CDMA mobile communication system, comprising the steps of:

receiving demodulated symbols from different paths and strengths of interferences from the paths and measuring the SIR of each frame using all the demodulated symbols of the frame;

receiving demodulated symbols of one path among the different path demodulated symbols and detecting symbol rate information from demodulated symbols in predetermined positions; and changing a threshold according to the detected symbol rate information, comparing the threshold with the SIR, and generating a forward power control command.

15. The forward power controlling method of claim 14, wherein the SIR measuring step comprises the steps of:

measuring the reception strengths of the demodulated symbols from the different paths;

measuring the SIR of a frame of each path using the reception strength and interference strength of the frame; and measuring a final SIR by averaging the SIRs.

16. The forward power controlling method of claim 14, wherein the symbol rate information is inserted not to be overlapped with reverse power control symbols in one of power control groups of the frame.

17. The forward power controlling method of claim 14, wherein the controller generates a forward power control command ordering power-down if the SIR is greater than the threshold and a forward power control command ordering power-up if the SIR is less than the threshold.

18. The forward power controlling method of claim 14, wherein the threshold is varied in proportion to the symbol rate represented by the detected symbol rate information.

* * * * *